Patented Aug. 11, 1925.

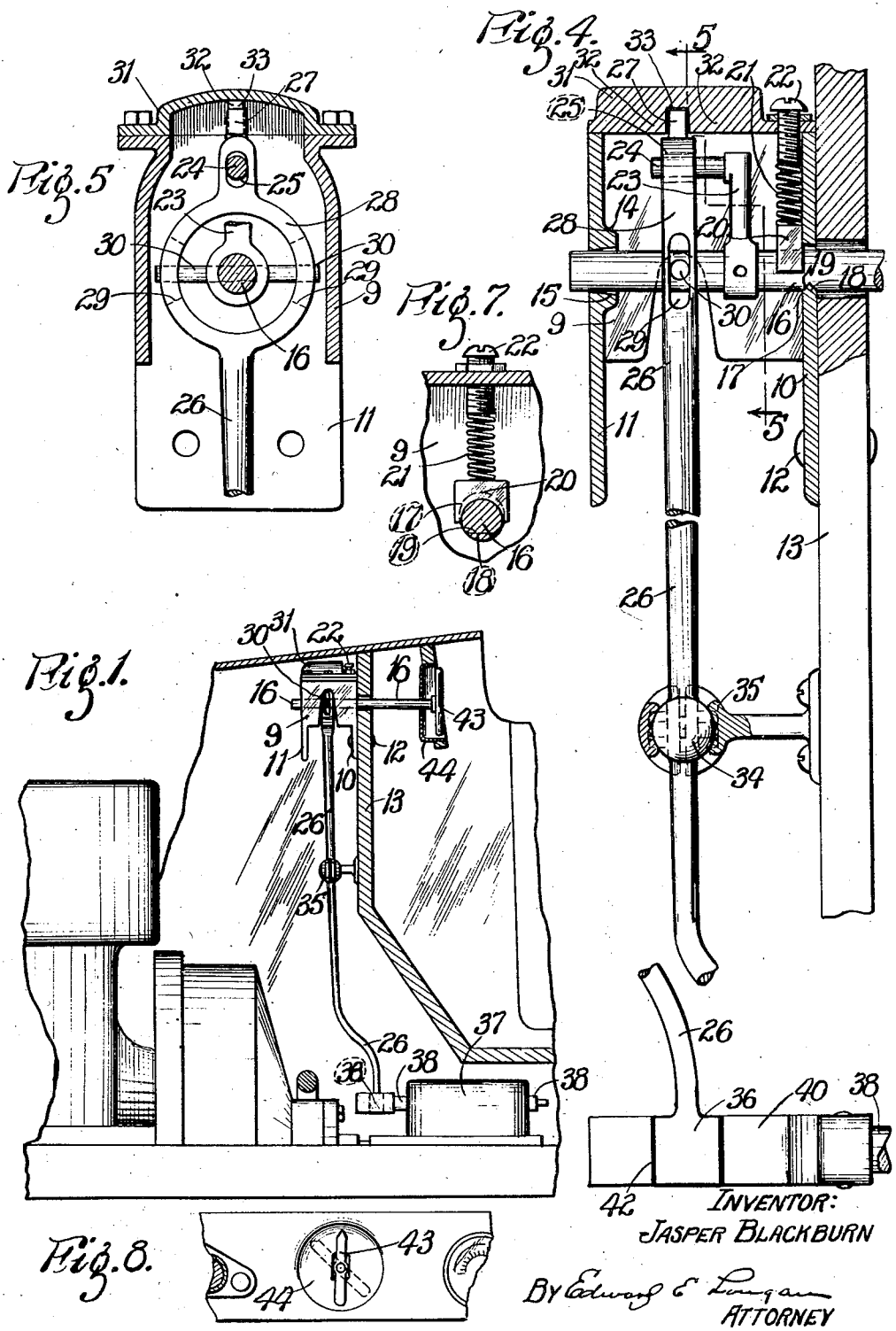

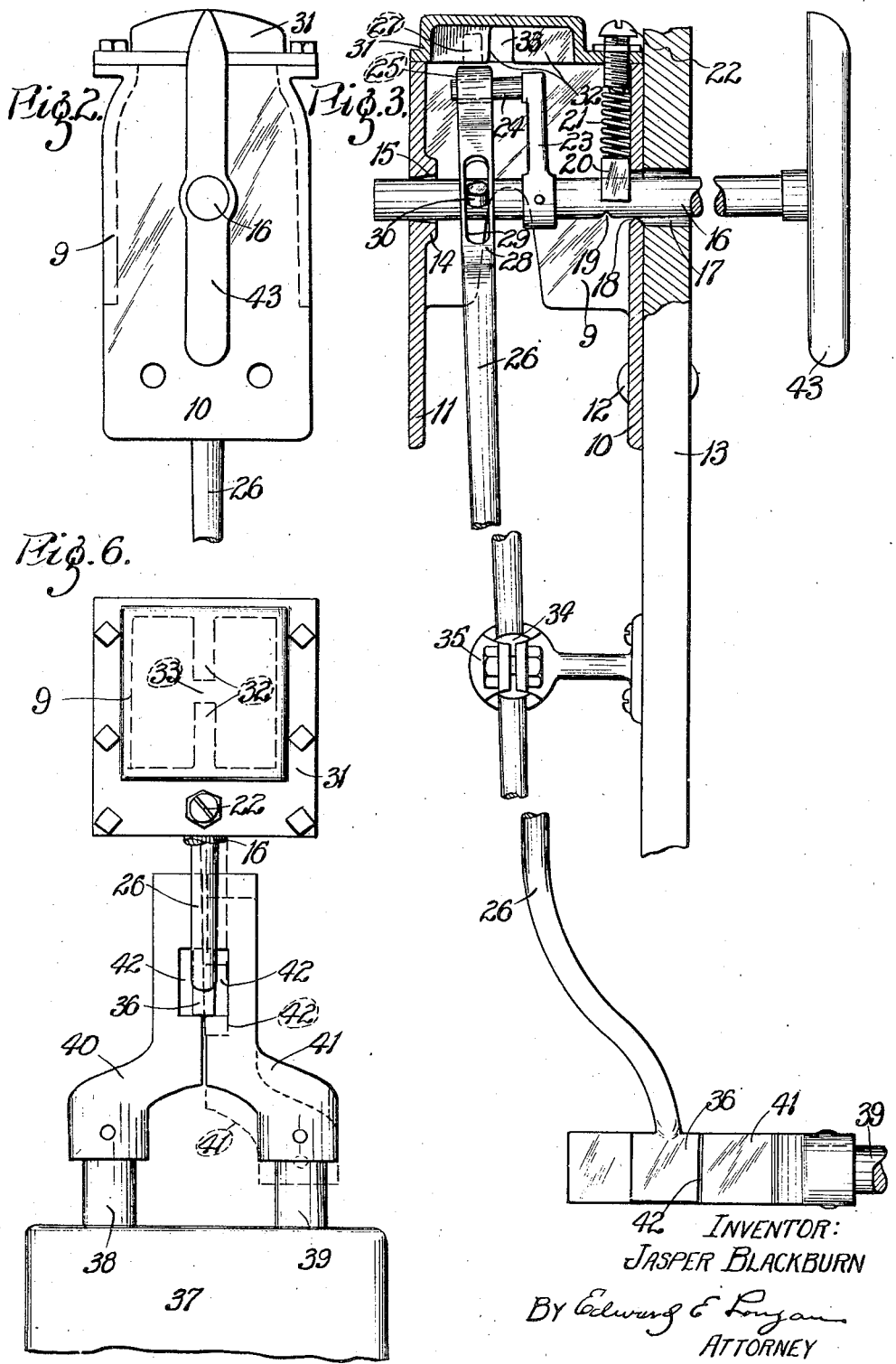

1,549,127

UNITED STATES PATENT OFFICE.

JASPER BLACKBURN, OF WEBSTER GROVES, MISSOURI.

SLIDING-GEAR-TRANSMISSION SHIFT.

Application filed October 31, 1923. Serial No. 671,932.

*To all whom it may concern:*

Be it known that I, JASPER BLACKBURN, a citizen of the United States, and resident of the city of Webster Groves, county of St. Louis, and State of Missouri, have invented certain new and useful Improvements in Sliding-Gear-Transmission Shifts, of which the following is a specification containing a full, clear, and exact description, reference being had to the accompanying drawings, forming a part thereof.

My invention relates to improvements in sliding gear transmission shifts and has for its primary object a shifting mechanism for sliding gear transmissions in which a single gear shift lever is employed and which lever is operated by means of a rod which is mounted in front of the driver of an automobile. The whole shifting mechanism being so mounted as to be removed entirely from the floor boards of the automobile.

A further object is to construct a sliding gear transmission shift which can be readily attached to any of the commercial types of sliding gear transmission without necessitating a great amount of change in the general structure of the car.

In the drawings:—

Fig. 1 is a fragmental vertical longitudinal section of an automobile showing my device in position;

Fig. 2 is a front elevation of the same removed from the automobile with parts broken away;

Fig. 3 is a vertical section of my device showing the same in one of the shifted positions;

Fig. 4 is a similar view showing the same in neutral position;

Fig. 5 is a vertical cross section taken on the line 5—5 of Fig. 4;

Fig. 6 is a top plan view of my device;

Fig. 7 is a fragmental vertical section showing the manner of holding the operating rod against vibration; and Fig. 8 is a fragmental view of an instrument board showing my device in position thereon.

In carrying out my invention, I employ a housing 9 which is open at its top and bottom. This housing is provided with side walls and end walls. The end walls are provided with downward projections 10 and 11, which are provided with perforations to permit the passage of securing bolts 12 by means of which the device is attached to the dash board 13. The rear wall of the housing is provided with a boss 14, which boss is provided with a tapered opening 15 to receive the operating rod 16. The front wall of the housing is provided with an elongated opening 17. This opening is elongated vertically and has its lower edge V-shaped as at 18, which portion is adapted to enter a V groove 19 formed in the under-surface of the rod 16.

Slidably mounted in the housing 9 is a shoe 20 which is held in contact with the rod 16 by means of a coil spring 21, tension of this spring is regulated by means of a screw 22 and is for the purpose of preventing vertical vibration of the rod 16. Mounted on the rod 16 is a finger 23 which carries a pin 24. This pin extends through a slot 25 formed in the upper end of the shift lever 26. The upper end of the shift lever 26 terminates in a projection 27. The purpose of which will be explained in detail later. Adjacent the upper end of the shifter 26 and below the slot 25 is formed an enlargement 28, this enlargement is provided with a central opening and is preferably circular in form. The enlargement 28 is slotted as at 29 so that the pin 30 carried by the rod 16 can pass therethrough. The purpose of this pin is to impart longitudinal movement to the lever 26 when the operating rod is moved forward and backward.

Secured to the housing 9 is a cap 31 which is provided with central longitudinally extending ribs 32. These ribs are spaced apart so as to form a passage way 33, through which the projection 27 is adapted to pass. When the device is in neutral the projection 27 is in the passage way 33 and consequently the lever 26 cannot be moved forward or backward. The lever 26 is provided intermediate its ends with a ball 34 which fits into a socket 35, this socket is preferably mounted on the dash 13 but may be otherwise located if found necessary. The lower end of the shaft 26 terminates in a flattened portion 36, the purpose of which will be explained in detail later.

The sliding gear transmission is provided with a housing 37. This transmission may be of any of the standard commercial types now in use and is provided with the usual shifter bars 38 and 39. Secured to the bars 38 and 39 are extensions 40 and 41 which are so arranged as to have their opposing edges in close proximity to each other. Each of these extensions is provided in its opposing edge with cutaway portions or recesses 42 into which the flattened portion 36 of the lever extends.

The operating rod 16 projects forward and is provided on its free end with a handle 43 by means of which the rod can be rotated and moved backward and forward. The rod extends through an indicator plate 44 which is suitably marked so that the neutral point can be readily ascertained.

The operation of my device is as follows:—

When the device is in neutral the parts are in the position shown in Fig. 4 in which the projection 27 is in the passage way 33 and any forward or backward movement of the handle will cause the projection to contact with the ribs 32 and prevent any shifting of gears. This is essential because when the device is in neutral the flattened portion 36 of the lever 26 projects into a portion of both recesses 42 in the extensions 40 and 41 and if it were possible to move the lever while in this position a pull on the operating rod would shift the gears so that the transmission would simultaneously be shifted into low and high and if pushed inwardly would shift the device into reverse and second speeds, that is, if a standard shift was employed, and it is for this purpose that the ribs or projections 32 are placed in the cover 31.

When it is desired to shift gears and start the automobile forward, the handle is turned to the left. This by means of the finger 23 and pin 24 moves the upper portion of the lever to the left and the lower toward the right so that the flattened portion 36 is now seated wholly within the recess formed in the extension 41. The handle is then pulled toward the operator which moves the lower portion of the lever 26 forward carrying with it the extension 41 and shifter rod 39, this places the device in first position. Of course, in order to impart longitudinal movement to the shaft 16 the handle 43 and rod 16 must be raised so as to disengage the notch 19 from the V-shaped edge 18 of the opening 17. After the machine has acquired sufficient momentum, the rod 16 is pushed back until the low gear is disengaged, the handle then turned to right so that the flattened portion of the lever 26 engages in the recess 42 formed in the extension 40, the handle is again raised and pushed inward to move the lower portion 36 of the lever 26 backward carrying with it the extension 40 and moving the shifter rod 38 backward. The device is now in second speed and then after traveling a sufficient distance to gain momentum the handle is pushed straight forward, which first disengages the second speed and a continued forward movement of the handle without any rotation placing the machine in high gear. The reverse being operated by turning the handle from neutral to right and pushing the rod inward.

All of the movements as described in this operation are for what is commercially termed the standard shift. It is a well known fact that several automobile manufacturers make use of a sliding gear transmission in which the movements of the shift lever to get various speeds are different. This difference in movement to obtain the various speeds however, will not affect my device at all because the movement of the handle is precisely the same as would be the movement of the shift lever were the old style shift employed.

Having fully described my invention, what I claim is:—

1. A sliding gear transmission shift comprising a housing, a shaft rotatably and slidably mounted in said housing, a shift lever provided adjacent its upper end with a ring shaped enlargement having diametrically opposite peripheral slots, a ball and socket joint intermediate the ends of said lever, a pin carried by said shaft and extending through said slot for imparting a forward and backward movement to said shift lever, means engaging with the upper end of said lever for preventing forward and backward movement of said shift lever when the same is in neutral position, and means carried by the shaft and engaging with said shift lever for moving the same from side to side.

2. In a device of the class described comprising in combination with a sliding gear transmission having shifter bars, of extensions carried by said shifter bars, a shift lever having a ring shaped enlargement provided with peripheral slots adjacent its upper end, a pivotal mounting for said shift lever, a housing, a shaft mounted in said housing and extending through said ring shaped enlargement, a pin carried by said shaft and extending through the slots of the enlargement for imparting a backward and forward movement to said shift lever, a finger carried by said shaft and adapted for sliding engagement with said shift lever for imparting a side to side movement thereto whereby said shifter bars may be selected and operated, and means for preventing forward and backward movement of the shifter lever when the same is in neutral position.

3. In a sliding gear transmission shift comprising in combination with a sliding gear transmission having shifter bars, of extensions provided with notches secured to said bars, a shift lever having its lower end extending into said notches, a ring shaped enlargement provided with peripheral slots integral with said lever adjacent its upper end, a slotted extension above said ring shaped enlargement, a pivotal mounting for said lever intermediate its ends, a housing surrounding the upper end of said lever, a shaft rotatably and slidably carried in said housing and extending through the ring shaped enlargement, a pin carried by said shaft and extending into the peripheral slots for imparting a backward and forward movement to said lever, a finger carried by said shaft and adapted for sliding engagement with the slotted extension for imparting side movement to said lever, means within said housing for preventing forward and backward movement of the lever when in neutral position, and means within the housing for preventing side movement of said lever when in shifted position.

4. In a sliding gear transmission shift comprising in combination with a sliding gear transmission having shifter bars, of extensions provided with notches secured to said bars, a shift lever having its lower end extending into said notches, a ring shaped enlargement provided with diametrically opposite peripheral slots integral with said lever adjacent its upper end, a slotted extension above and integral with said ring shaped enlargement, a ball and socket mounting for said lever intermediate its ends, a housing surrounding the upper end of said lever, a shaft rotatably and slidably carried in said housing and extending through the ring shaped enlargement, a pin carried by said shaft and extending into the peripheral slots for imparting a forward and backward movement to said lever, a finger carried by said shaft, a pin carried by the finger and extending into the slotted projection whereby side to side movement can be imparted to said lever, means within said housing for preventing forward and backward movement of said lever and shaft when the lever is in neutral position, means within the housing for preventing side movement of said lever when in shifted position, and means carried by the housing and engaging with the shaft whereby accidental sliding movement of the shaft is prevented while the lever is being moved from side to side.

In testimony whereof, I have signed my name to this specification.

JASPER BLACKBURN.